Figure 1:
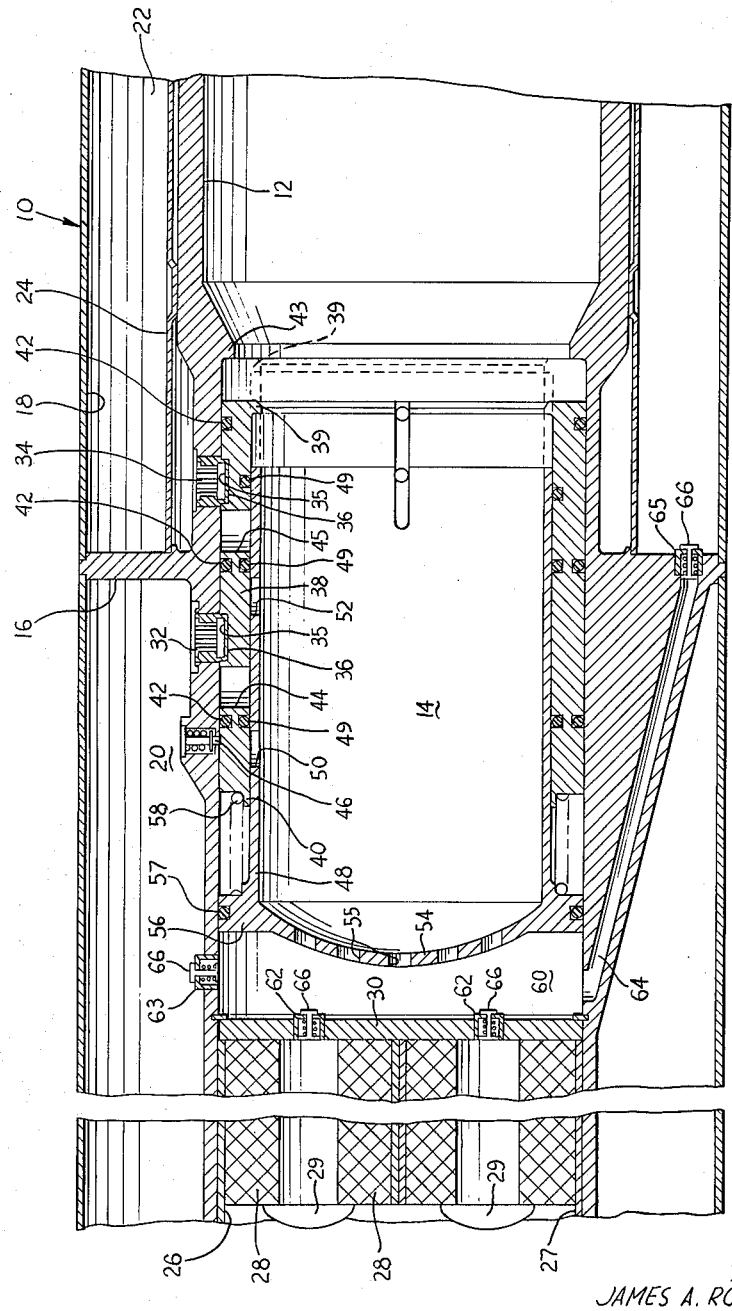

INVENTOR.
JAMES A. ROSSETTO
BY
AGENT

United States Patent Office 3,246,467
Patented Apr. 19, 1966

3,246,467
THRUST TERMINATION AND RESTART MEANS
FOR LIQUID ROCKET POWERPLANTS
James A. Rossetto, Orlando, Fla., assignor to Thiokol
Chemical Corporation, Bristol, Pa., a corporation of
Delaware
Filed Jan. 22, 1963, Ser. No. 253,081
12 Claims. (Cl. 60—35.6)

This invention relates generally to rocket powerplants and more particularly to improved means for terminating operation of a liquid propellant rocket powerplant and for subsequently restarting it.

There is an ever increastng demand for more versatile rockets capable of satisfying the requirements of a variety of missile applications. One of these applications involves the termination of rocket thrust at a predetermined interval after ignition with a subsequent restarting of the powerplant upon signal or automatically.

Various structures have been devised for accomplishing such rocket thrust termination and subsequent restarting but insofar as is known, these have either been overly complex, involved too much added weight, were too difficult to fabricate, or failed to embody the necessary safety precautions against accidental leakage and the like required in view of the explosive nature of the propellants employed.

Accordingly, the main object of the present invention is to proivde a liquid propellant rocket powerplant having improved means for thrust termination and for restarting the powerplant which is simple in construction, light in weight, susceptible of ready and economic fabrication and safe in operation.

Another important object of the present invention is to provide a novel propellant-flow-controlling sleeve for the shear slide of a liquid propellant rocket powerplant, the sleeve and slide co-operating when pressurized for a predetermined period to initiate propellant flow, to then shut off propellant flow, and subsequently to initiate a second flow when again pressurized.

Other objects and advantages of the invention will become apparent during the course of the following description.

In the drawings I have shown one embodiment of the invention. In this showing:

The drawing figure is a central, longitudinal sectional view of the invention.

While the principles of the invention are applicable to liquid propellant rocket powerplants of the monopropellant, bi-propellant hypergolic, and non-hypergolic types, they are herein illustrated in connection with the use of two hypergolic propellants.

Referring to the drawings, numeral 10 designates the rocket powerplant as a whole which includes a cylindrical centrally positioned, axially disposed combustion chamber 12 terminating aft in an exhaust nozzle (not shown). The combustion chamber 12 extends forwardly to define an injection and mixing chamber 14 having an outwardly extending peripheral flange or bulkhead 16 which terminates at the spaced outer wall 18 of the rocket powerplant, all defining fuel and oxidizer tanks 20, 22, the latter having a baffle 24 to direct oxidizer about its aft end and along the outer surface of the combustion chamber 12 as shown by the arrow for regenerative cooling purposes as is conventional practice.

The injection chamber 14 extends forwardly to define a plurality of separate gas generating chambers 26, 27, each containing solid propellant grain 28 and igniters 29 which may be initiated by remote signal or time fuze, and closed by a bulkhead 30. While only two gas generators are shown, it is to be understood that any desired number (each one permitting a single separate start of the powerplant) may be employed as long as the total duration of the gases separately generated bears a definite relation to the amount of propellants contained in the tanks.

The propellant tanks surrounding the combustion chamber 12 and the mixing chamber 14 have direct connection with the latter by means of a plurality of circumferentially spaced fuel and oxidizer inlet ports 32, 34 which are closed and sealed by shear cups 35 which project into the mixing chamber where they are supported in spaced recesses 36 of an open-ended cylindrical shear slide 38 having an aft in-turned flange or stop 39. The shear slide 38 is provided with a forwardly projecting lip 40, is sealed against leakage by a plurality of spaced seals 42, and is movable from the full line position shown to the dotted line position shown against an inwardly projecting flange or stop 43 which defines the forward end of the combustion chamber 12.

The shear slide 38 is provided with a plurality of axially-spaced circumferentially arranged fuel and oxidizer ports 44 and 45 which become aligned with the inlet ports 32, 34 when the shear slide 38 moves to the stop 43 shearing the cups 35 and being retained against the stop by a spring actuated detent 46 mounted in the mixing chamber wall which is permitted to drop in front of the front end of the slide 38.

A cylindrical propellant-flow-controlling sleeve 48 open at its aft end is slidably mounted in the shear slide 38 and sealed against leakage between the two by O-ring seals 49. The sleeve 48 is provided with spaced fuel and oxidizer ports 50, 52 which are aligned with the fuel and oxidizer slide ports 44, 45 when the sleeve 48 moves from the full line position shown to the dotted line position shown against the slide stop 39. In such position, the ports remain aligned with each other when the slide 38 moves to the dotted line position against the stop 43 to also align the ports with the propellant inlet ports 32 and 34. It is to be noted that only in this latter position where the three groups of ports are aligned, is it possible for pressurized propellants from the tanks 20 and 22 to be injected into the mixing chamber 14.

The forward end of the sleeve 48 is closed by a head 54 which includes a plurality of apertures 55 for the passage of generator gases for mixing and/or ignition purposes depending on the type of fuel, and with a peripheral flange 56 including a seal 57 which is slidable along the wall of the mixing chamber 14. A strong compression spring 58 is mounted in the space defined by the sleeve 48, its head flange 56, and the forward end of the shear slide 38 and its lip 40 for a purpose to be described.

It will be noted that the sleeve head 54 defines a chamber 60 with the bulkhead 30 closing the generators and when any one is ignited, generated gas will pass through its port 62 and into the chamber 60 where a portion passes by port 63 and conduit 64 and bulkhead port 65 into the fuel and oxidizer tanks 20 and 22 to pressurize the same. Another portion of the generated gases will pass through the sleeve head apertures 55 into the mixing chamber 14 to assist in mixing the injected propellants and the balance of the generator gases will act against the sleeve head 54 and tend to move the sleeve aft or to the right as shown.

It is, of course, very important that the fuel and oxidizer do not leak back into the chamber 60 upon exhausting of a gas generator with subsequent lower system pressures, or that the ignition of one gas generator does not ignite another. To this end, each of the ports 62, 63, and 65 are provided with one-way valves 66 which may be of the pressure-operated poppet or an equivalent type so as to ensure flow therethrough in only a single direction.

Upon ignition of the first gas generator 26 or 27, the propellant tanks 20 and 22 become pressurized and the sleeve head 54 becomes pressure loaded and the sleeve 48 moves to the right against the slide stop 39 and compresses the spring 58 during this movement. The pressure loading now acts through the stop 39 to move both the sleeve 48 and the shear slide 38 to the right until the slide engages the stop 43 against which it is locked by the spring-actuated detent 46. The sealing cups 35 are sheared by the slide 38 during the initial part of this movement.

At this time, the sleeve ports 50, 52 and the shear slide ports 44, 45 are aligned with the fuel and oxidizer inlet ports 32, 34 so as to admit the pressurized propellants into the mixing chamber 14 and operation of the rocket power plant 10 is thus initiated to continue until the first gas generator is expended.

The pressure throughout the system thereupon drops to unload the sleeve 48 and the spring 58 returns it to its original position relative to the shear slide 38 to close the propellant inlet ports in the slide to thus effect shutdown of the rocket powerplant.

When it is desired to restart the powerplant, the second gas generator is ignited. The buildup of pressure pressurizes the propellant tanks 20 and 22 and again loads the sleeve 48 which moves to the right against the shear slide stop 39 to reopen the propellant ports. The rocket powerplant is thus restarted and operation continues until the propellant supply is exhausted.

It will now be readily apparent that the invention is much simpler, lighter and easier to fabricate than other devices for terminating the thrust of a liquid propellant rocket powerplant and for restarting it.

It is to be understood that the form of the invention herewith shown and described is to be taken as a preferred example of the same and that various changes in the shape, size and arrangement of parts may be resorted to without departure from the spirit of the invention or the scope of the subjoined claims:

I claim:

1. In a liquid propellant rocket powerplant having a combustion chamber terminating in an exhaust nozzle, propellant tankage having propellant ports communicating with said chamber, seals closing said ports and projecting into said chamber, a slide including ports movable from a first position to a second position to shear said seals and align its ports with said propellant ports to admit propellant to said chambers, and exhaustible means for generating pressure gases to pressurize said tankage, the improvement comprising a sleeve including ports slidably mounted in said slide and responsive to generated pressure gases to move from a first position with respect to said slide to a second position; into engagement with a portion of said slide to align said slide ports and said sleeve ports and to move said slide to said second position, said sleeve being movable back to said first position to disalign said slide and sleeve ports to cut off propellant flow to said chamber, and additional seals preventing propellant leakage between said sleeve and said slide in said first position.

2. The invention recited in claim 1, and detent means automatically operable when said slide reaches said second position to engage said slide and prevent movement thereof.

3. The invention recited in claim 1 wherein said second position is a stop formed on the wall of said chamber, and detent means automatically engageable with the other end of said slide to prevent movement thereof.

4. The invention recited in claim 1, and means acting between said sleeve and said slide to effect reverse movement of said sleeve to said first position with respect to said slide upon exhausting of said pressure generating means.

5. The invention recited in claim 4 wherein said acting means comprises a spring.

6. The invention recited in claim 4, and additional gas generating means communicating with said sleeve and operable upon ignition to restart said powerplant by again effecting movement of said sleeve to said second position with respect to said slide to admit additional propellant to said combustion chamber.

7. The combination recited in claim 11, and second pressure generating means operable to effect a second sequential operation of all of said means.

8. A liquid propellant rocket powerplant comprising, in combination, a combustion chamber terminating in a nozzle, a mixing chamber including a stop flange at its aft end opening into said combustion chamber, and having propellant inlet ports communicating with said mixing chamber, a plurality of generators for producing pressurizing gases mounted in the head of the powerplant and having communication with said tanks to pressurize the same and with said mixing chamber, a slide mounted in said mixing chamber at a point spaced from said stop flange and closing said inlet ports and having ports alignable with said inlet ports upon movement of said slide against said stop flange, said slide having a stop, a sleeve including ports mounted in said slide at a point spaced from said slide stop and movable thereagainst in response to pressurizing gases to align its ports with said slide ports and to move said slide against said stop flange to align all of said ports to admit propellants into said mixing chamber, and means to effect reverse movement of said sleeve with respect to said slide upon exhausting of the pressure gases of one of said generators to disalign said sleeve ports and said slide ports and terminate the flow of propellants into said mixing chamber.

9. The combination recited in claim 8 wherein said last mentioned means comprises a spring.

10. The combination recited in claim 8, and means movable against said slide upon its movements into engagement with said stop flange to prevent reverse movement of said slide.

11. In a liquid propellant rocket powerplant having a combustion chamber, a propellant tank including ports communicating with said chamber, and exhaustible pressurizing means communicating with said chamber and with said propellant tank to pressurize the latter; the improvement comprising means movable to admit propellant through said ports into said chamber, additional means responsive to said pressurizing means to effect movement of said movable means, and means acting between said movable means and said additional means to effect reverse movement of said additional means upon exhausting of said pressurizing means to shut off propellant from said chamber.

12. In a liquid propellant rocket powerplant having a combustion chamber, a propellant tank including ports communicating with said chamber, and exhaustible pressurizing means communicating with said chamber and with said propellant tank to pressurize the latter, the improvement comprising means movable to admit propellant through said ports into said chamber and additional means reciprocably movable responsive to said pressurizing means to engage and effect movement of said movable means, said additional means being relatively movable into and out of engagement with said movable means to initiate and to terminate propellant flow through said ports.

References Cited by the Examiner

UNITED STATES PATENTS

| 2,943,673 | 7/1960 | Hickman | 60—39.48 X |
| 3,032,979 | 5/1962 | Corbett | 60—39.48 X |
| 3,094,837 | 6/1963 | Sherman et al. | 60—39.48 X |
| 3,106,060 | 10/1963 | Comer | 60—39.48 X |

MARK NEWMAN, *Primary Examiner.*

ABRAM BLUM, SAMUEL LEVINE, *Examiners.*